United States Patent [19]

Ono et al.

[11] Patent Number: 5,031,998

[45] Date of Patent: Jul. 16, 1991

[54] POLARIZATION CONTROL ON SIGNAL BEAMS FOR PRINCIPAL-STATE BIDIRECTIONAL TRANSMISSION THROUGH AN OPTICAL FIBER

[75] Inventors: Takashi Ono; Shuntaro Yamazaki, both of Tokyo, Japan

[73] Assignee: NEC Corporation, Tokyo, Japan

[21] Appl. No.: 564,941

[22] Filed: Aug. 9, 1990

[30] Foreign Application Priority Data

Aug. 9, 1989 [JP] Japan .................. 1-206346

[51] Int. Cl.⁵ .................................. G02B 6/16
[52] U.S. Cl. ..................... 350/96.29; 350/96.30
[58] Field of Search ............. 350/96.29, 96.30, 96.15

[56] References Cited

U.S. PATENT DOCUMENTS

| | | | |
|---|---|---|---|
| 4,781,424 | 11/1988 | Kawachi et al. | 350/96.30 |
| 4,793,678 | 12/1988 | Matsumoto et al. | 350/96.15 |
| 4,960,319 | 10/1990 | Dankowych | 350/96.29 |

OTHER PUBLICATIONS

C. D. Poole et al., "Polarization Dispersion and Principal States in a 147-km Undersea Lightwave Cable", Journal of Lightwave Technology, vol. 6, No. 7, Jul. 1988, pp. 1185-1190.
R. Noe et al., "Endless Polarization Control Systems for Coherent Optics", Journal of Lightwave Technology, vol. 6, No. 7, Jul. 1988, pp. 1199-1208.

Primary Examiner—Frank Gonzalez
Attorney, Agent, or Firm—Sughrue, Mion, Zinn, Macpeak & Seas

[57] ABSTRACT

In a polarization control system for use in an optical communication system comprising an optical fiber (11), first and second polarization control devices (31, 41) are controlled to make the optical fiber bidirectionally transmit first and second signal beams with their respective incident polarization states rendered coincident with a common one or with respective ones of two principal states of the optical fiber. When the first signal beam is supplied to the first polarization control device with a first original polarization state and passes through the second polarization control device with a first variable polarization state and when the second signal beam is supplied to the second polarization control device with a second original polarization state and passes through the first polarization control device with a second variable polarization state, the first polarization control device keeps the second variable polarization state parallel or orthogonal to the first original polarization state. The second polarization control device keeps the first variable polarization state parallel or orthogonal to the second original polarization state. Each of the signal beams may be either a single signal beam or an FDM'ed signal beam.

19 Claims, 3 Drawing Sheets

POLARIZATION CONTROL ON SIGNAL BEAMS FOR PRINCIPAL-STATE BIDIRECTIONAL TRANSMISSION THROUGH AN OPTICAL FIBER

BACKGROUND OF THE INVENTION

This invention relates to a polarization control system for use in an optical communication system for bidirectionally transmitting optical signal beams. In general, an optical communication system comprises an optical fiber having first and second bifer ends. The optical fiber is, for example, from 20 to 100 km long and has a birefringence which is inevitably subjected at various points of the length to variations due to the ambient temperature of the optical fiber, external pressure supplied to the optical fiber, or both. It is therefore unavoidable that a signal beam has a polarization state or plane which undergoes fluctuations from time to time while transmitted through the optical fiber.

In the optical communication system, a first or first-end transmitter device and a first or first-end receiver device are connected to the first fiber end. A second or second-end transmitter device and a second or second-end receiver device are connected to the second fiber end. Each of the first and the second receiver devices is operable with a local beam having a local polarization state to produce a detection signal having a power level.

The first transmitter device is for generating a first signal beam and for supplying the first signal beam to the first fiber end with a first original polarization state. Transmitted through the optical fiber, the first signal beam arrives at the second fiber end as a first arriving beam to be received by the second receiver device. Due to the fluctuations in the polarization state, the first arriving beam has a first variable polarization state. Consequently, the second receiver device can not always have a best receiver sensitivity.

The second transmitter device is for generating a second signal beam and for supplying the second signal beam to the second fiber end with a second original polarization state. Transmitted through the optical fiber, the second signal beam arrives at the first fiber end as a second arriving beam to be received by the first receiver device. The second arriving beam has a second variable polarization state. As a result, the first receiver device can not always have a best receiver sensitivity.

It is possible to avoid occurrence of the fluctuations in the polarization state and to always achieve best receiver sensitivities if the optical fiber is a polarization maintaining optical fiber. The polarization maintaining optical fiber is, however, very expensive. It is therefore usual to use a single-mode optical fiber and a polarization control system in order to suppress the fluctuations.

The polarization control system may be operable according either to automatic polarization control or to polarization diversity. When the polarization diversity is resorted to, each receiver device must have a complicated structure. Moreover, the receiver sensitivity becomes poor. It is therefore preferred to use the automatic polarization control for simplicity of each receiver device and for achievement of a high receiver sensitivity.

An excellent polarization control system is disclosed in U.S. patent application Ser. No. 527,470 filed May 23, 1990, by the present applicants based on two patent applications which were filed in Japan and given Patent Application Nos. 130,510 and 130,511 of 1989. The polarization control system is for use in a bidirectional optical communication system of the type described and comprises a single polarization control device. The United States patent application will be referred to as a prior patent application in the following.

In the manner known in the art, the polarization control device comprises an optical fiber which is called a control fiber in the prior patent application and has a device and a fiber end as called in the prior patent application. It should be noted in connection with the prior patent application and the instant patent application that the control fiber is a part of the single-mode optical fiber. The device end is therefore one of the above-mentioned first and second fiber ends and may be the first fiber end without loss of generality.

According to the prior patent application, the single polarization control device is for collectively controlling the first and the second variable polarization states. A little more in detail, a control circuit is connected to the first receiver device to be supplied with the detection signal and controls the polarization control device so as to keep the power level maximum.

In the prior patent application, polarization dispersion is discussed. The polarization dispersion occurs due to the birefringence of the optical fiber either when the first and the second signal beams are single signal beams and have a finite frequency difference or when at least one of the first and the second signal beams is the frequency division multiplexed signal beam in which individual component signal beams have frequency differences. The single polarization control device is therefore effective only when the frequency difference is within a certain allowable range. As a consequence, the number of collectively polarization controllable channels is restricted. Furthermore, the polarization dispersion becomes serious when the optical fiber is long. The polarization dispersion therefore restricts a communication possible distance or length.

SUMMARY OF THE INVENTION

It is therefore an object of the present invention to provide a collective polarization control system which is for use in a bidirectional optical communication system and can avoid adverse influences of polarization dispersion.

It is another object of this invention to provide a polarization control system of the type described, which can remove a restriction on the number of collectively polarization controllable channels.

It is still another object of this invention to provide a polarization control system of the type described, which can remove a restriction on a communication possible distance.

Other objects of this invention will become clear as the description proceeds.

On describing the gist of this invention, it is possible to understand that a polarization control system if for use in a bidirectional optical communication system comprising an optical fiber which comprises a first fiber part having a first fiber end supplied with a first signal beam having a first original polarization state and a second fiber part having a second fiber end supplied with a second signal beam having a second original polarization state. The first signal beam arrives at the second fiber end as a first arriving beam having a first variable polarization state. The second signal beam arrives at the first fiber end as a second arriving beam having a second variable polarization state. According to the above-reference prior patent application, the polarization control system comprises first polarization control means connected to the first fiber end for controlling the second variable polarization state to keep the second variable polarization state in a first predetermined relationship with the first original polarization state.

According to this invention, the above-understood polarization control system is characterized by second polarization control means which is connected to the second fiber part for controlling the first variable polarization state to keep the first variable polarization state in a second predetermined relationship with the second original polarization state.

DESCRIPTION OF THE PREFERRED EMBODIMENTS

Figure 1:
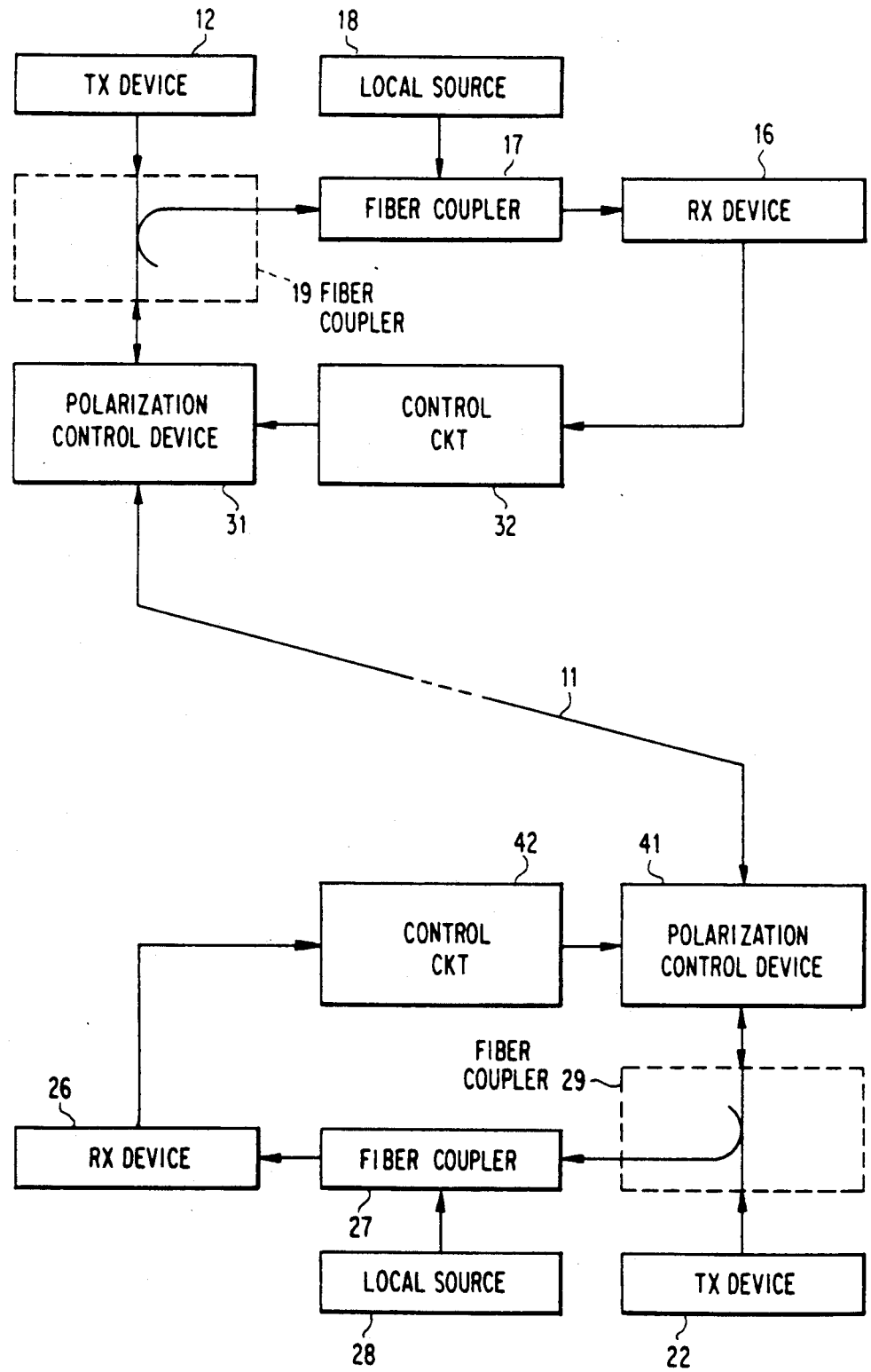
FIG. 1 is a block diagram of a bidirectional optical communication system which comprises a collective polarization control system according to a first embodiment of the instant invention.

Referring to FIG. 1, a bidirectional optical communication system comprises a collective polarization control system according to a first embodiment of the present invention. The optical communication system comprises an optical fiber 11 which is a single-mode optical fiber and is 100 km long. The optical fiber 11 comprises first and second fiber parts leftwardly and rightwardly of the figure in the manner which will later be described. The first fiber part has a first fiber end at its leftmost end. The second fiber part has a second fiber end at its rightmost end. The first and the second fiber ends will become clear as the description proceeds.

A first or first-end transmitter device 12 is connected to the first fiber end through a first local (optical) fiber and serves as a first signal beam source for generating a first signal beam which is a single optical beam subjected to frequency shift keying (FSK) modulation at a bit rate of 1.2 Gb/s. A first or first-end receiver device 16 is connected through a first local optical fiber coupler 17 to a first local beam source 18 for generating a first local beam. The first receiver device 16 is connected to the first fiber end by a first main or transmission and reception optical fiber coupler 19. In the first main optical fiber coupler 19, the first fiber end is connected to the first local fiber and to a branch which is connected to the first receiver device 16 through the first local optical fiber coupler 17.

A second or second-end transmitter device 22 is connected to the second fiber end through a second local (optical) fiber and serves as a second signal beam source for generating a second signal beam which is again a single optical beam subjected to frequency shift keying modulation at the bit rate of 1.2 Gb/s. A second or second-end receiver device 26 is connected through a second local optical fiber coupler 27 to a second local beam source 28 for generating a second local beam. The second receiver device 26 is connected to the second fiber end by a second main or transmission and reception optical fiber coupler 29. In the second main optical fiber coupler 29, the second fiber end is connected to the second local fiber and to a branch connected to the second receiver device 26 through the second local optical fiber coupler 27.

Each optical fiber coupler 17, 19, 27, or 29 serves as an optical beam combining or coupling device and as an optical beam branching or separating device depending on the circumstances. Consequently, the first signal beam is supplied to the first fiber end and transmitted through the optical fiber 11 towards the second fiber end. Arriving at the second fiber end as a first arriving beam, the first signal beam is branched to the second receiver device 26. The second signal beam is supplied to the second fiber end and transmitted through the optical fiber 11 towards the first fiber end. Reaching the first fiber end as a second arriving beam, the second signal beam is branched to the first receiver device 16.

Each of the first and the second signal beam is generated by the transmitter device 12 or 22 as a linearly polarized signal beam having a certain plane or polarization. It is possible in the known manner to polarization adjust the plane of polarization either parallel or orthogonal to a predetermined direction. In the manner which will later be described, the first signal beam is supplied to the first fiber end with a first original polarization state. The second signal beam is supplied to the second fiber end with a second original polarization state. The first local beam is supplied to the first receiver device 16 with a first local polarization state. In other words, the first receiver device 16 is operable with the first local beam which has the first local polarization state. The second receiver device 26 is operable with the second local beam having a second local polarization state. Each receiver device 16 or 26 is operable either as an optical heterodyne receiver device or as an optical homodyne receiver device depending on its structure.

While transmitted through the optical fiber 11, the polarization state of each signal beam is subjected to fluctuations. As a result, the first arriving beam has a first variable polarization state. The second arriving beam has a second variable polarization state.

Unless the second variable polarization state is orthogonal to the first local polarization state, the first receiver device 16 produces a first detection signal having a first power level or a first signal intensity. Likewise, the second receiver device 26 produces a second detection signal having a second power level.

In order to put each receiver device 16 or 26 in operation with a high receiver sensitivity, the collective polarization control system is used in polarization controlling the first variable polarization state to keep the first variable polarization state always parallel to the second local polarization state and in polarization controlling the second variable polarization state always parallel to the first local polarization state.

In practice, the first original and the first local polarization states are polarization adjusted so as to be either parallel or orthogonal to each other. The second original and the second local polarization states are polarization adjusted to be either parallel or orthogonal to each other.

As a consequence, the second variable polarization state is polarization controlled so as to be in a first selected one of a parallel and an orthogonal relationship with the first original polarization state. The first variable polarization state is polarization controlled to be in a second selected one of a parallel and an orthogonal relationship with the second original polarization state. These first and second selected ones are herein called a first and a second predetermined relationship.

The collective polarization control system comprises a first polarization control device 31. In the manner known in the art, such a polarization control device comprises an optical fiber.

The above-mentioned first fiber part is the optical fiber of the first polarization control device 31 and a little extends leftwardly in the figure to the first fiber end.

A first control circuit 32 is supplied with the first detection signal and controls the first polarization control device 31 so as to keep the first power level maximum. The second variable polarization state is thereby kept in the first predetermined relationship with the first original polarization state.

Various polarization control devices are already known in the art. For example, the polarization control device 31 comprises several piezoelectric actuators (not shown) which are arranged along the optical fiber of the polarization control device 31 and are supplied with the detection signal to squeeze the optical fiber. In compliance with the power level, the polarization control device 31 keeps the second variable polarization state in the first predetermined relationship with the first original polarization state. If desired, its detail should be understood by reference to an article contributed by Reinhold Noé and two others to the Journal of Lightwave Technology, Volume 6, No. 7 (July 1988), pages 1199 to 1208, under the title of "Endless Polarization Control System for Coherent Optics".

In cooperation with the first receiver device 16 and its related circuitry, a combination of the first polarization control device 31 and the first control circuit 32 serves as a first polarization control arrangement. It is therefore possible to understand that the first polarization control arrangement (31, 32) is connected to the first fiber part and is for controlling the second variable polarization state to keep the second variable polarization state in the first predetermined relationship with the first original polarization state.

If the first and the second signal beams have a substantially common frequency or wavelength, the first polarization control arrangement alone is sufficient to keep the first variable polarization state in the second predetermined relationship with the second original polarization state in the manner described in the prior patent application referred to hereinabove. The first polarization control arrangement alone is, however, insufficient when the first and the second signal beams have a finite frequency difference, such as 100 GHz or a wavelength difference of 0.8 nm. This is due to polarization dispersion, which will now be described in detail.

Figure 2:
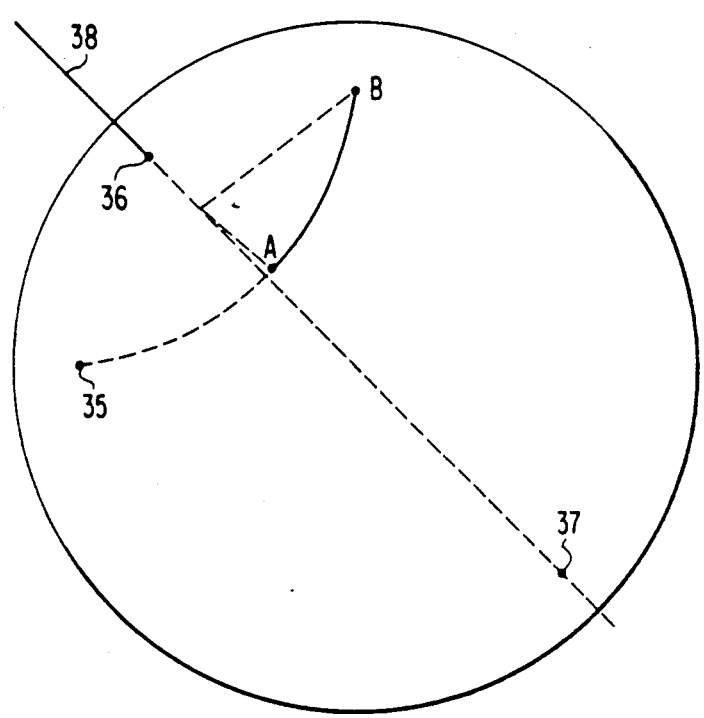
FIG. 2 is a schematic illustration of a Poincaré sphere for use in describing polarization dispersion.

Turning to FIG. 2 during a short while, a Poincaré sphere will be referred to in order to discuss the polarization dispersion. It will be presumed merely for simplicity of the description that the first signal beam is a frequency division multiplexed (FDM'ed) signal beam which consists of first and second component signal beams having a finite frequency difference. The first and the second component signal beams are assumed to have a common incident polarization state 35 on the Poincaré sphere on leaving the first fiber part. Reaching the second fiber part, the first and the second component signal beams have first and second output polarization states A and B which are different points on the Poincaré sphere.

On the other hand, it is possible to define, as regards two orthogonally polarized states in a long single-mode optical fiber, two principal states in the manner described in an article contributed by C. D. Poole et al to the Journal of Lightwave Technology, Volume 6, No. 7 (July 1988), pages 1185 to 1190, under the title of "Polarization Dispersion and Principal States in a 147 km Undersea Lightwave Cable". Such two principal states of the optical fiber are exemplified as first and second principal states 36 and 37 on the Poincaré sphere. An axis which passes through the first and the second principal states 36 and 37, will be called a principal axis 38.

The incident polarization state 35 and the first and the second output polarization states A and B are on a plane which is perpendicular to the principal axis 38. An arc AB is defined on the Poincaré sphere along a small circle at which this plane intersects with the Poincaré sphere. The first and the second output polarization states A and B rotate around the principal axis 38 along the small circle at a rotation vetio which is defined by the polarization dispersion. Subtended by the arc AB at the principal axis 38, an angle is in proportion to a product of the polarization dispersion and the frequency difference.

When the first and the second component signal beams leave the first fiber part with a different incident polarization state, the arc AB has a different arc length. If the incident polarization state coincides with one of the principal states, the arc AB has a zero arc length irrespective of the frequencies or the wavelengths of the first and the second component signal beams. That is, the first and the second output polarization states have a common output polarization state which coincides with one of the principal states that is used as the incident polarization state. This fact is used on collectively polarization controlling the first and the second variable polarization states according to this invention. Briefly speaking, this fact is used to control the principal states which the optical fiber 11 has between the first and the second fiber parts.

Turning back to FIG. 1, a second polarization control device 41 is used in addition to the first polarization control device 31. The second polarization control device 41 comprises an optical fiber which serves as a principal portion of the second fiber part mentioned above.

A second control circuit 42 is supplied with the second detection signal and controls the second polarization control device 41 so as to keep the second power level maximum. The first variable polarization state is thereby kept in the second predetermined relationship with the second original polarization state.

More particularly, it will be assumed without loss of generality that the second original polarization state is parallel to the second local polarization state. That is, it will be assumed that the first variable polarization state should be polarization controlled to be parallel to the second original polarization state among the second predetermined relationship. The second local polarization state is rendered parallel to the second original polarization state in the following manner.

In FIG. 1, a polarization beam splitter is used in place of the second main optical fiber coupler 29. Adjusting the second transmitter device 22, the second original polarization state is first polarization adjusted so that the second signal beam may pass through the polarization beam splitter with a maximum signal intensity. Subsequently, the second local polarization state is polarization adjusted by adjustment of the second local beam source 28 so that the second receiver device 26 may optimally receive the first arriving beam, namely, so that the second power level may be maximized. The polarization beam splitter may either be left for use as the second main optical fiber coupler 29 or be changed back to the fiber coupler 29.

On maximizing the first power level, the first transmitter device 12 and the first local beam source 18 are likewise polarization adjusted. When the first and the second polarization control devices 31 and 41 are controlled in the above-described manner, the first signal beam is supplied through the first polarization control device 31 to the optical fiber 11 in one of the principal states of the optical fiber 11. The second signal beam is supplied from the second polarization control device 41 to the optical fiber 11 either in this one or the other of the principal states of the optical fiber 11. In this event, a combination of the optical fiber 11 and the first and the second polarization control devices 31 and 41 is operable like a polarization maintaining optical fiber in cooperation with the first and the second control circuits 32 and 42 and the first and the second receiver devices 16 and 26 and their related circuitry.

In cooperation with the second receiver device 26 and its related circuitry, a combination of the second polarization control device 41 and the second control circuit 42 serves as a second polarization control arrangement. It is therefore possible to understand that the second polarization control arrangement (41, 42) is connected to the second fiber part and is for controlling the first variable polarization state to keep the first variable polarization state in the second predetermined relationship with the second original polarization state.

Each of the first and the second control circuit 32 and 42 is implemented in practice by a computer which maximizes the power level at a certain control speed. One of the first and the second control circuits 32 and 42 should be operable faster than the other. This is in order to prevent oscillation from occurring in the first and the second predetermined relationships. By way of example, one of the first and the second control circuits 32 and 42 should maximize the power level in about 10 ms and the other, in about 100 ms.

Figure 3:
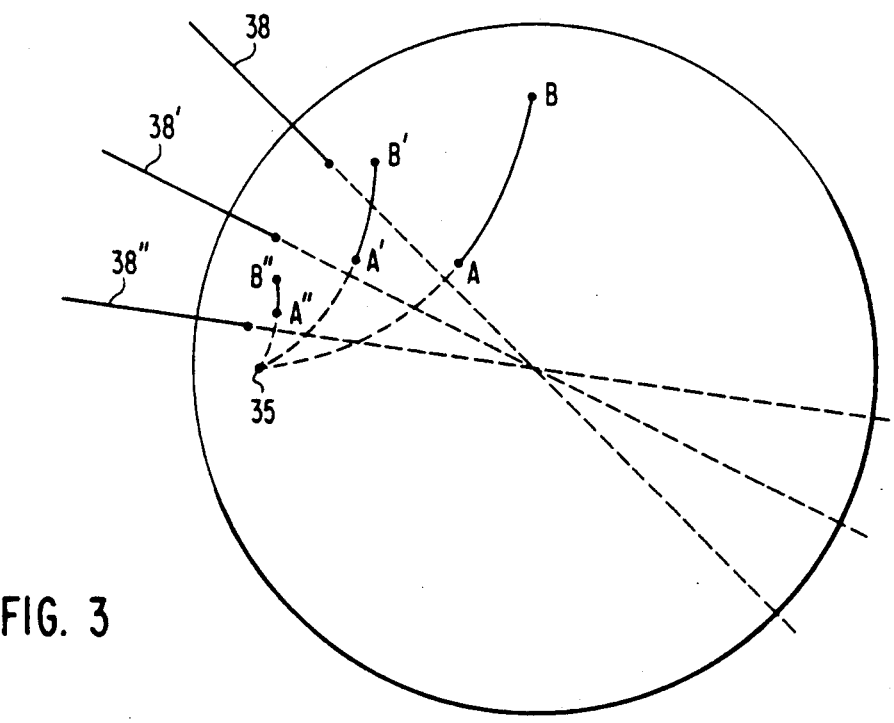
FIG. 3 is another schematic illustration of the Poincaré sphere for use in describing principles of operation of the polarization control system depicted in FIG. 1.

Turning to FIG. 3 and continuously referring to FIG. 1, the collective polarization control will be discussed with reference to the Poincaré sphere. The incident polarization state 35 is again illustrated. The principal axis 38 is also depicted and will be referred to as a first principal axis. The first and the second output polarization states A and B are also depicted. The arc AB will be called a first arc.

It will be surmised that the second polarization control device 41 is controlled so as to maximize the second power level of the second detection signal which is produced by the second receiver device 26 in response to the first arriving beam with the second local polarization state rendered either parallel or orthogonal to the second original polarization state and that the first polarization control device 31 is used in the meantime in slightly varying the first principal axis 38, namely, the first and the second principal states of the optical fiber 11 which are exemplified in FIG. 2 at 36 and 37. The control of the second power level is equal to decreasing the length of the arc AB. Therefore, when the first principal axis 38 is varied to a second principal axis 38', the first arc AB becomes a second arc A'B'. When the second principal axis 38' is further varied to a third principal axis 38", the second arc A'B' becomes a third arc A"B". In the example being illustrated, the first through the third arcs have decreasing arc lengths which converge to the incident polarization state 35 when the principal axis is optimally varied. When the arc length reaches to zero, the incident polarization state 35 is coincident with the principal state 36.

The first polarization control device 31 is now controlled to maximize the first power level of the first detection signal produced in response to the second arriving beam. In this manner, peak search is carried out to maximize the first and the second power levels. Upon completion of the peak search, the first and the second signal beams are automatically polarization controlled so as to be transmitted through the optical fiber 11 in a common one or in individual ones of the principal states of the optical fiber 11 which are varied in the manner described above in connection with the principal axis.

Attention will now be directed to principal-state transmission of the first and the second signal beams described in conjunction with FIG. 1. It is possible to understand that the optical fiber 11 comprises the first and the second fiber parts and a single-mode optical fiber between the first and the second fiber parts. The single-mode optical fiber 11 has the first and the second principal states 36 and 37 which are exemplified in connection with FIG. 2.

The first polarization control device 31 is controlled to supply the first signal beam from the first fiber part to the single-mode optical fiber with an incident polarization state which is coincident with a first one of the first and the second principal states 36 and 37. In this event, the first signal beam is delivered from the single-mode optical fiber to the second fiber part of the second polarization control device 41 with an excit polarization state which is coincident with the first one of the two principal states 36 and 37. The second polarization control device 41 is controlled to supply the second signal beam from the second fiber part to the single-mode optical fiber with an incident polarization state coincident with a second one of the first and the second principal states 36 and 37. Transmitted through the single-mode optical fiber, the second signal beam is supplied to the first fiber part with an output polarization state coincident with the second one of the principal states 36 and 37. The first and the second ones of the two principal states 36 and 37 may either be a common one or be different ones of the two principal states 36 and 37.

In an example of the optical communication system illustrated with reference to FIG. 1, the optical fiber 11 had a polarization dispersion of about 3 ps. When the first and the second polarization control devices 31 and 41 were controlled so as to maximize the first and the second power levels, each of the first and the second receiver devices 16 and 26 was subjected to a penalty of less than 0.1 dB as compared with its best receiver state. According to the above-referenced prior patent application, the penalty was 4.6 dB when the first and the second signal beams of a frequency difference of 100 GHz were transmitted through the optical fiber having a polarication dispersion of about 3 ps. An unexpected improvement is therefore achieved in the receiver sensitivity.

Figure 4:
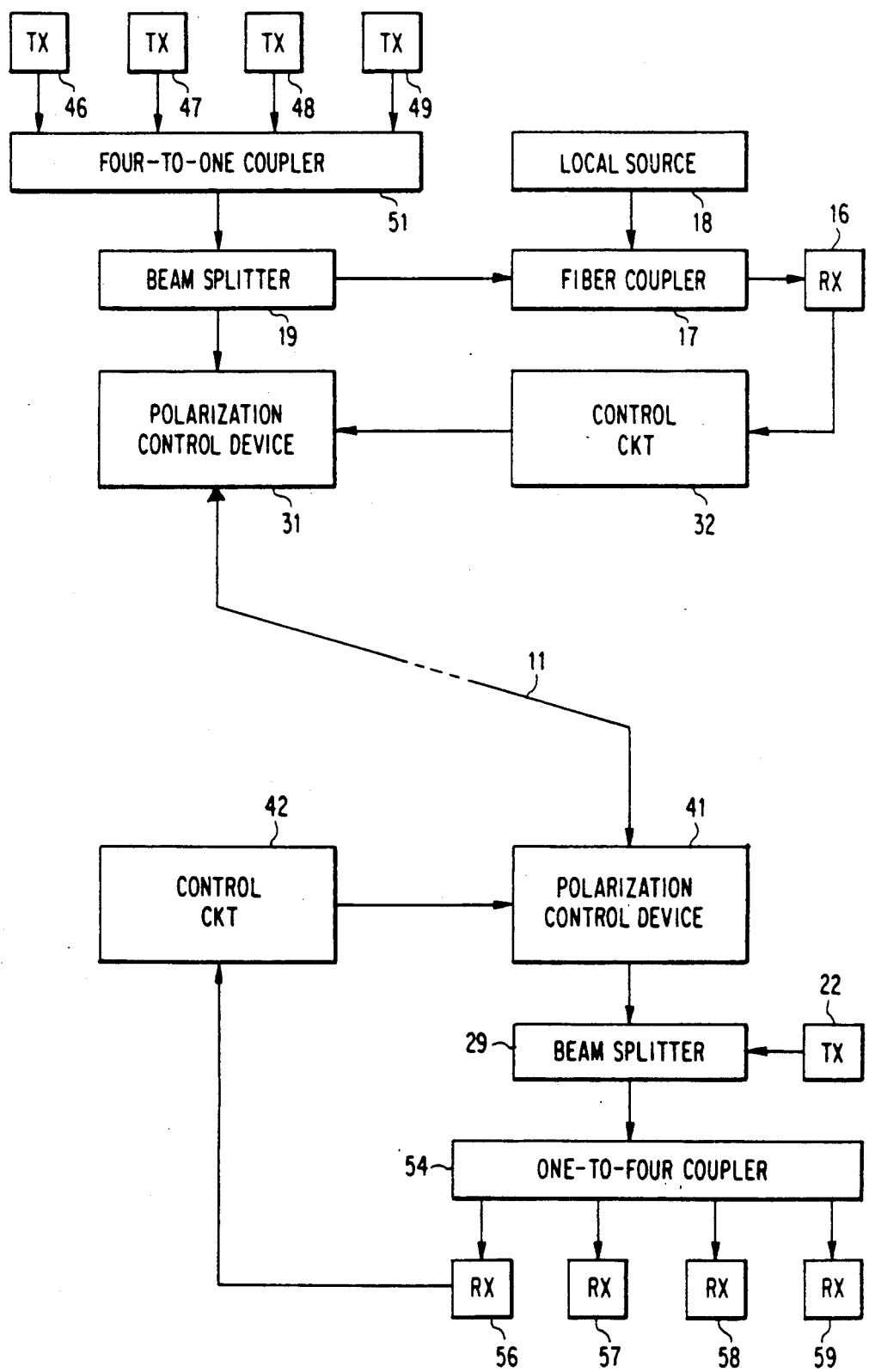
FIG. 4 is a block diagram of another optical communication system which comprises a polarization control system according to a second embodiment of this invention.

Referring now to FIG. 4, another bidirectional optical communication system comprises a collective polarization control system according to a second embodiment of this invention. Similar parts are designated by like reference numerals and are operable with likewise named optical and electric signals. It will be seen that first and second polarization separating elements, such as first and second polarization beam splitters, are used in place of the first and the second main optical fiber couplers 19 and 29 and are designated by these reference numerals.

In FIG. 4, first through fourth transmitters 46, 47, 48, and 49 are signal beam sources for generating first through fourth component signal beams having first through fourth frequencies or wavelengths. It will be assumed that the first and the fourth frequencies have a widest frequency difference of 150 GHz. A four-to-one optical fiber coupler 51 is for coupling the first through the fourth component signal beams into a frequency division multiplexed signal beam to deliver the frequency division multiplexed signal beam to the first polarization separating element 19 and thence to the first polarization control device 31 as the first signal beam. A combination of the first through the fourth transmitters 46 to 49 and the four-to-one optical fiber coupler 51 therefore serves at the first transmitter device 12 described in conjunction with FIG. 1.

Through a one-to-four optical fiber coupler 54, the first arriving beam is delivered to first through fourth receivers 56, 57, 58, and 59. The second local beam comprises first through fourth component local beams having frequencies related to the first through the fourth frequencies. Each of the receivers 56 through 59 is an optical heterodyne or homodyne receiver. The first through the fourth receivers 56 to 59 thereby receive the first through the fourth component signal beams which the first arriving beam comprises. A combination of the one-to-four optical fiber coupler 54 and the first through the fourth receivers 56 to 59 therefore serves as the second receiver device 26 described in connection with FIG. 1.

The second control circuit 42 is supplied with the second detection signal from a predetermined one of the first through the fourth receivers 56 to 59. In the example being illustrated, the second detection signal is produced by the first receiver 56.

When the polarization beam splitter is used as each of the first and the second polarization separating elements 19 and 29, it is readily possible to exactly control the first original polarization state either parallel or orthogonal to the second original polarization state. In an example of the optical communication system illustrated with reference to FIG. 4, wherein the optical fiber 11 was 80 km long and has a polarization dispersion of 2.5 ps and wherein the collective polarization control was carried out on the first component signal beam and the second signal beam in the manner exemplified in FIG. 4, the fourth receiver 59 was subjected to a penalty of less than 0.1 dB as compared with its best receiver state. Each of the first through the fourth receivers 56 to 59 therefore has an excellent receiver sensitivity.

Reviewing FIG. 1, it is now understood that an additional signal beam can be transmitted from the first transmitter device 12 to the optical fiber 11 through the first polarization control device 31. The additional signal beam may have a polarization state which is either parallel or orthogonal to the polarization state of the "first signal beam" described before. The expression "first original polarization state" should therefore be understood to include at least two parallel and/or orthogonal polarization states. When such two or more signal beams have orthogonal polarization states, the second local beam source 28 should produce the second local beam with a pertinent local polarization "state".

In FIG. 4, it is possible to use the second transmitter device 22 is generating another frequency division multiplexed signal beam as the second signal beam. In each of the first and the second signal beams, the component signal beams may have parallel and/or orthogonal polarization states in the manner described reviewing FIG. 1.

While this invention has thus far been described in specific conjunction with two preferred embodiments thereof and various modifications, it will now be readily possible for one skilled in the art to carry this invention into effect in verious other manners. For example, each of the first and the second main optical fiber couplers 19 and 29 may be composed of polarization maintaining optical fiber segments. This is preferred because it becomes readily possible to exactly polarization adjust the polarization states of a plurality of component signal beams.

What is claimed is:

1. A polarization control system for use in a bidirectional optical communication system comprising an optical fiber which comprises a first fiber part having a first fiber end supplied with a first signal beam having a first original polarization state and a second fiber part having a second fiber end supplied with a second signal beam having a second original polarization state, said first signal beam arriving at said second fiber end as a first arriving beam having a first variable polarization state, said second signal beam arriving at said first fiber end as a second arriving beam having a second variable polarization state, said polarization control system comprising:
   first polarization control means connected to said first fiber part for controlling said second variable polarization state to keep said second variable polarization state in a first predetermined relationship with said first original polarization state; and
   second polarization control means connected to said second fiber part for controlling said first variable polarization state to keep said first variable polarization state in a second predetermined relationship with said second original polarization state.

2. A polarization control system as claimed in claim 1, said optical fiber comprising a single-mode optical fiber between said first and said second fiber parts, said single-mode optical fiber having two principal states which are orthogonal to each other, wherein:
   said first polarization control means is for supplying said first signal beam from said first fiber part to said single-mode optical fiber with a first incident polarization state which is coincident with a first one of said two principal states;
   said second polarization control means being for supplying said second signal beam from said second fiber part to said single-mode optical fiber with a second incident polarization state which is coincident with a second one of said two principal states.

3. A polarization control system as claimed in claim 2, wherein said first one of the two principal states in identical with said second one of the two principal states.

4. A polarization control system as claimed in claim 2, wherein said first one of the two principal states is different from said second one of the two principal states.

5. A polarization control system as claimed in claim 2, said bidirectional optical communication system further comprising first and second receiver devices connected to said first and said second fiber ends, said first receiver device being operable with a first local beam having a first local polarization state in said first predetermined relationship with said first original polarization state and being for receiving said second arriving beam to produce a first detection signal having a first power level, said second receiver device being operable with a second local beam having a second local polarization state in said second predetermined relationship with said second original polarization state and being for receiving said first arriving beam to produce a second detection signal having a second power level, wherein:
said first polarization control means is connected to said first receiver device to keep said first power level maximum;
said second polarization control means being connected to said second receiver device to keep said second power level maximum.

6. A polarization control system as claimed in claim 5, wherein each of said first and said second signal beams is a single signal beam.

7. A polarization control system as claimed in claim 6, wherein:
said second variable polarization state is kept parallel to said first original polarization state in said first predetermined relationship;
said first variable polarization state being kept parallel to said second original polarization state in said second predetermined relationship.

8. A polarization control system as claimed in claim 6, wherein:
said second variable polarization state is kept parallel to said first original polarization state in said first predetermined relationship;
said first variable polarization state being kept orthogonal to said second original polarization state in said second predetermined relationship.

9. A polarization control system as claimed in claim 6, wherein:
said second variable polarization state is kept orthogonal to said first original polarization state in said first predetermined relationship;
said first variable polarization state being kept parallel to said second original polarization state in said second predetermined relationship.

10. A polarization control system as claimed in claim 6, wherein:
said second variable polarization state is kept orthogonal to said first original polarization state in said first predetermined relationship;
said first variable polarization state being kept orthogonal to said second original polarization state in said second predetermined relationship.

11. A polarization control system as claimed in claim 5, wherein:
said first signal beam is a frequency division multiplexed signal beam;
said second signal beam being a single signal beam.

12. A polarization control system as claimed in claim 11, said second receiver device comprising a plurality of receivers, each receiver being operable with said second local beam to receive said first arrivint beam, wherein said second detection signal is produced by a predetermined one of said receivers.

13. A polarization control system as claimed in claim 12, wherein said frequency division multiplexed signal beam comprises a plurality of component signal beams having said first original polarization state in common.

14. A polarization control system as claimed in claim 13, wherein:
said second variable polarization state is kept parallel to said first original polarization state in said first predetermined relationship;
said first variable polarization state being kept parallel to said second original polarization state in said second predetermined relationship.

15. A polarization control system as claimed in claim 13, wherein:
said second variable polarization state is kept parallel to said first original polarization state in said first predetermined relationship;
said first variable polarization state being kept orthogonal to said second original polarization state in said second predetermined relationship.

16. A polarization control system as claimed in claim 13, wherein:
said second variable polarization state is kept orthogonal to said first original polarization state in said first predetermined relationship;
said first variable polarization state being kept parallel to said second original polarization state in said second predetermined relationship.

17. A polarization control system as claimed in claim 13, wherein:
said second variable polarization state is kept orthogonal to said first original polarization state in said first predetermined relationship;
said first variable polarization state being kept orthogonal to said second original polarization state in said second predetermined relationship.

18. A polarization control system as claimed in claim 5, wherein each of said first and said second signal beams is a frequency division multiplexed signal beam.

19. A polarization control system as claimed in claim 18, wherein:
the frequency division multiplexed signal beam of said first signal beam comprises a plurality of component signal beams having said first original polarization state in common;
the frequency division multiplexed signal beam of said second signal beam comprising a plurality of component signal beams having said second original polarization state in common.

* * * * *